United States Patent Office 3,606,519
Patented Sept. 20, 1971

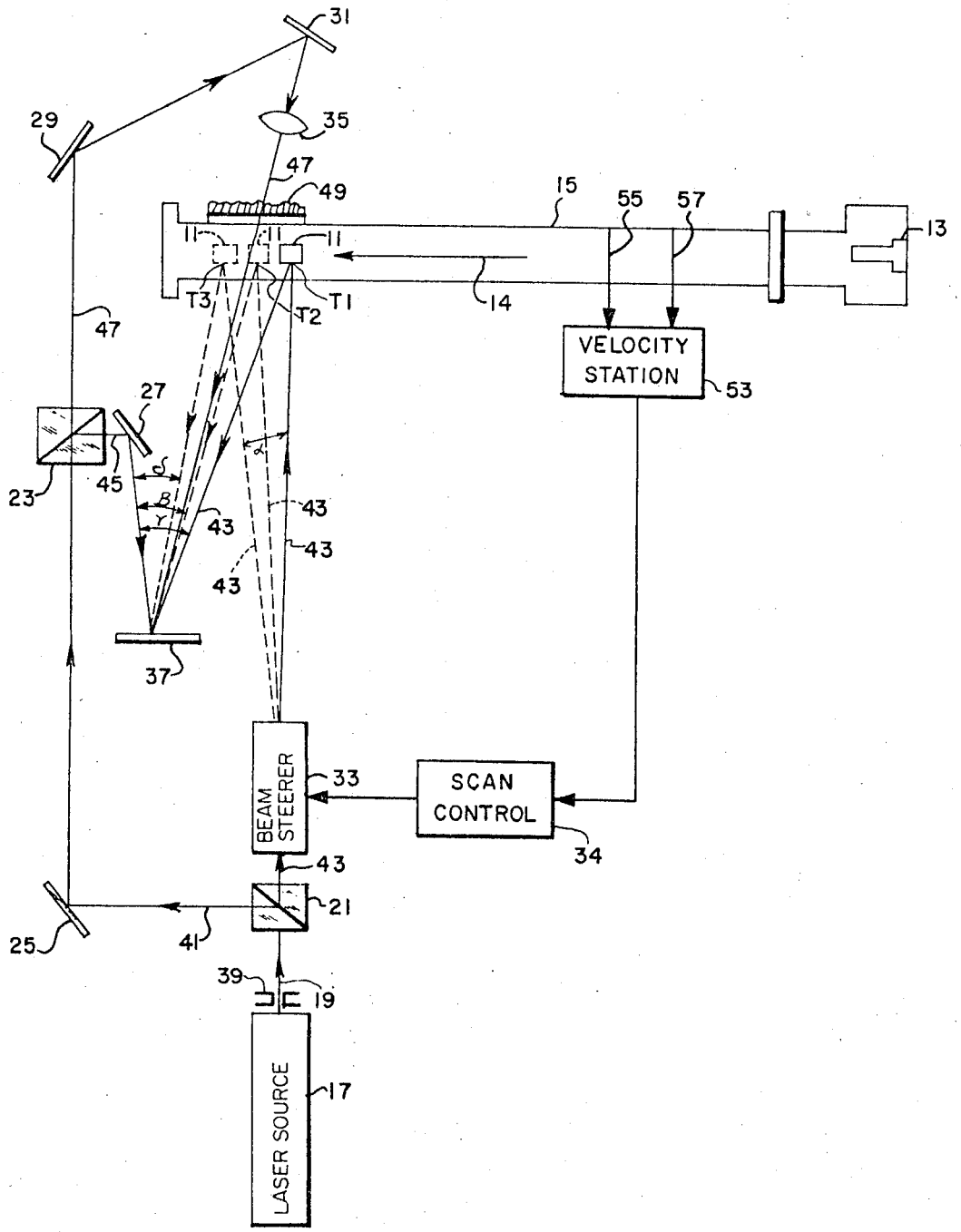

3,606,519
MULTIPLE IMAGE STORING SYSTEM FOR HIGH SPEED PROJECTILE HOLOGRAPHY
Robert L. Kurtz, Blacksburg, Va., assignor to the United States of America as represented by the Administrator of the National Aeronautics and Space Administration
Filed Feb. 2, 1970, Ser. No. 7,867
Int. Cl. G02b 27/22
U.S. Cl. 350—3.5
5 Claims

ABSTRACT OF THE DISCLOSURE

A three beam system for obtaining a holographic record on film of a high speed projectile, wherein a coherent beam of radiation is divided into a reference beam, a direct signal beam and a reflected signal beam. The reference beam is directed without modulation to a photographic plate and the direct signal beam is directed to the photographic plate after transmission by the projectile. The reflected signal beam is directed into a beam steerer which allows the synchronous tracking of the projectile with the reflected signal beam. On reflection from the projectile the reflected signal beam is incident on the photographic plate. As the included angle between the reference beam and the reflected signal beam changes, multiple images of the target will be stored in the thick emulsion of the photographic plate.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to motion holography and more particularly to an apparatus for recording and reconstructing high speed, three-dimensional objects in coherent light.

Presently, there are several techniques for producing holograms. The general requirements for dual beam hologram production are that one uses a coherent beam of radiation as a source and a beam splitter to obtain two coherent beams, one referred to as a signal beam and the other the reference beam. The reference beam is generally allowed to pass directly to a photographic recording plate without any form of disturbance. The signal beam is made incident on the object under test, either by reflection of the signal beam from the test object or by direct transmission of the signal beam through or by the test object. The test object, on which the signal beam is incident, imposes a specific modulation on the signal beam. This modulated signal beam is then made incident on a photographic plate along with the reference beam. At a given moment, the field pattern produced in the plane of the photographic plate (by the interference between the reference beam and the modulated signal beam) is essentially frozen by the photographic emulsion. This arrested field pattern is not a photograph in the usual sense, but is simply a recorded interference pattern. The developed plate constitutes a re-constructable hologram. That is, if the developed hologram is placed in the path of the reference beam alone, the image of the object under test is reconstructed. The image of the test appears in three dimensions with parallax identical to the original test object.

Two types or methods for producing holograms are the reflection method and the direct method. The reflection method as the name implies, reflects the signal beam from the test object in a forward direction where it is then made incident on the photographic plate. When a hologram taken by this method is reconstructed, the test object has excellent resolution as it is front illuminated; however, this method has a disadvantage of extremely stringent requirements on the mechanical stability of the test object and the component parts of the holographic camera. In general, if during exposure of the test object there is a shift in the path length of the signal beam of a much as one-half wavelength of the wavelength being used, the hologram will be washed out due to spatial amplitude modulation of the reconstructed wavefront.

In the direct method, the signal beam is transmitted through or by the test object after having first passed through a diffuser plate positioned between the light source and the test object. The direct method has the advantage of partially relaxing the stringent requirements of mechanical stability of the test object but has the disadvantage of no resolution of detail of the front surface of the test object since the test object is only illuminated from the back. Because of the aforementioned difficulties, holographic photography of high speed phenomenal has been severely limited in the past, particularly in those areas where front illumination of the test object is required or desired.

Accordingly, it is an object of this invention to provide an improved holographic system in which the object under study may have extreme velocity.

Another object of this invention is to provide a system for producing a hologram of moving objects which allows a high degree of front resolution.

Still another object of this invention is to provide a system for producing a series of holograms of a moving test object in sequential positions.

SUMMARY OF THE INVENTION

According to the present invention these and other objects may be accomplished by dividing a substantially coherent electromagnetic beam of radiation into three beams of coherent radiation, one of which is modulated by the test object as in the reflection method, one of which is modulated by the test object as in the direct method and one of which is utilized as a reference beam. The reference beam and the direct signal beam are directed toward a photographic plate in the conventional manner. The reflected signal beam, however, is directed into a beam steerer placed between the object and the laser source. The beam steerer functions to transmit the reflected signal beam so as to illuminate the front of the test object and to maintain the tangential velocity of the signal beam at the test object the same as the linear velocity of the test object. Upon reflection from the test object, the reflected signal beam is incident on the photographic plate. The reference beam, the direct signal beam and the reflected signal beam, which are incident on the photographic plate, cause an interference pattern to be recorded in the thick emulsion of the photographic plate. As the test object moves, the included angle between the reference beam and the reflected signal beam changes. From the principles of holography, it is well known that the position of the recorded image is a clear function of the included angle between the signal beam and the reference beam. Therefore due to the change in the included angle between the reference beam and the reflected signal beam, multiple interference patterns will be recorded, thereby allowing the storage of more than one image of the test object in sequential positions.

BRIEF DESCRIPTION OF THE DRAWING

Other objects and advantages of the present invention will become apparent by reference to the accompanying drawing wherein the sole figure is a representation of an optical system for producing a hologram of a hypervelocity projectile according to the present invention.

DESCRIPTION OF THE PREFERRED EMBODIMENT

Referring to the sole figure, there is shown an embodiment of the present invention for recording the image of a high speed projectile 11 that is shot from a breech 13 positioned at one end of a gun tube 15. The projectile 11 is shown at three different positions or times T1, T2 and T3 as it moves away from breech 13 along the velocity vector indicated by arrow 14. The system for obtaining a holograph of the moving projectile 11 includes a laser 17, shutter 39, beam splitters 21 and 23, front surface mirrors 25, 27, 29 and 31, a beam steerer 33, a lens 35, a velocity station 53, a scan control circuit 34 and a photographic plate 37 for recording the hologram.

The system is operated, firstly, with beam splitter 21 in place as shown, to split the output beam 19 of the laser source 17 into a beam 41 and a signal beam 43, hereinafter referred to as the reflected signal beam 43. Shutter 39 is used to control the exposure time when the laser 17 is of the continuous wave type. If a pulsed laser is used the shutter 39 may of course be eliminated. Beam 41 is directed by mirror 25 to beam splitter 23, which splits beam 41 into reference beam 45 and a second signal beam 47, hereinafter referred to as the direct signal beam 47. The direct signal beam 47, is directed via front surface mirrors 29 and 31 through lens 35 and a diffuser 49 to the back of the projectile 11. The diffuser 49 may consist of any type frosted glass and performs the function of providing uniform illumination of the projectile and provides a range of angle for beam 47 instead of just one angle, thereby relaxing stability requirements. A portion of the beam 47 is transmitted through or by the projectile 11 which modulates it and is then made incident on the photographic plate 37. The reference beam 45 is directed via front surface mirror 27 directly to the photographic plate 37 without any form of modulation.

The reflected signal beam 43 is directed into a beam steerer 33 for scanning the beam 43 through an angle α lying in the plane of the velocity vector 14. The beam steerer 33 may be of the piezoelectric form as described by Fowler and Schlafer in Applied Optics 5,1675 (1966) and is utilized to obtain scanning of the beam 43 in accordance with a signal supplied by the scan control circuit 34.

Beam 43 is directed to the front surface of the projectile 11 in such a manner that the tangential velocity of the reflected signal beam 43 at the projectile 11 is equal to the linear velocity of projectile 11. At each position T1, T2 and T3 the reflected signal beam 43 is modulated by reflection from the front surface of the test object and is then made incident on the photographic plate 37.

In the operation of the present invention, the orientation of the reflected signal beam 43, the direct signal beam 47 and the reference beam 45 is adjusted so as to cause the reference beam 45 to interfere with both the modulated reflected signal beam 43 and the modulated direct signal beam 47 and additionally to cause the modulated reflected beam 43 to interfere with the modulated direct signal beam 47. To accomplish these three interferences, which together are simultaneously recorded on the photographic plate, the three beams must be superimposed at the film plane both in space and in time. To insure that the three beams are superimposed in time, the difference in the length of the beam paths of the reflected signal beam 43, the direct signal beam 47 and the reference beam must be less than the coherence length of the laser 17 so as to cause an overlap at the photographic plate, of radiation from the laser 17 that is coherent with respect to one another.

Because a hologram records an interference pattern and is thus sensitive to the phase of the impinging light beams, the effects of the motion of the test object on the reconstructed image are, in general, different than those in a conventional photographic (imaging) system. In order to record a given point in the scene over the area of the hologram, it is necessary that the fringe pattern resulting from the interference between light beams remain essentially stationary during the exposure. Motion of the test object which causes motion of the fringes tends to reduce their recorded contrast and to reduce the strength of the reconstructed waves. As previously stated it has been found that back lighted test objects permits relatively large motion whereas for front lighted test objects the motion is usually restricted to less than one half of the wavelength of the light.

In the now preferred embodiment of the present invention, the integrity of the reflected signal beam 43 is maintained by selecting the proper deflection rate of beam 43, such that the beam 43 when incident on the projectile 11 will have a zero relative velocity between the velocity of the projectile and the tangential velocity of beam 43 at projectile 11. Since the relative velocity is zero there will be effectively no path length change of the signal beam over an incremental distance of travel of the projectile 11.

It will be recognized that to accomplish the synchronous tracking of the projectile 11 with beam 43, the scanning of beam 43 must initiate at position T1, with beam 43 having a tangential velocity at the projectile 11 equal to the linear velocity of the projectile 11. In one form of the invention this may be accomplished by ascertaining the velocity of the projectile 11 a known distance upstream from position T1 by use of a conventional velocity station 53 having wire grids 55 and 57. This velocity information is then utilized by the scan control circuit 34 to synchronize the projection of beam 43 and the arrival of projectile 11 at position T1.

Further having synchronized the appearance of both the projectile 11 and the beam 43 at position T1, the beam steerer must properly deflect the beam 43 over the desired incremental distance of travel of projectile 11. That is, beam steerer 33 deflects beam 43 at such a rate as to maintain equality between the tangential velocity of beam 43 and the linear velocity of projectile 11 over the incremental distance. The proper rate of deflection sufficient to accomplish the desired tangential velocity of beam 43 may be obtained from the velocity information obtained from velocity station 53 and fed to the scan control circuit 34. For example, if a sinusoidal wave form is the input to the beam steerer, as would be the case if the beam steerer was of the piezoelectric form, then the frequency of this input waveform is given by $$f = 1/T$$

where T is the time of transit of projectile 11 from position T1 to position T3.

It will be recognized that the scan control circuit 34 could take the form of a variable frequency oscillator having both the frequency and time of initiation of its output signal dependent on the velocity information received from the velocity station 53.

As the projectile 11 moves, the reflected signal beam 43 is reflected from the projectile to the photographic plate 37 where in the thick emulsion of the plate there is recorded the interference pattern caused by the interference between the reference beam 45 with both the modulated reflection signal beam 43 and the modulated direct signal beam 47 and additionally the interference pattern caused by the modulated reflected signal beam 43 and the modulated direct signal beam 47.

It will be seen in the sole figure that as the projectile 11 moves the included angle between the modulated reflected beam 43 and the reference beam changes from γ at time T1 to β at time T2 and to δ at time T3. Because of this, multiple images of the projectile will be stored in the thick emulsion of the photographic plate.

After development of the plate 37, on may reconstruct the image of projecticle 11 by allowing the reference beam 45 alone to be incident on the hologram at the proper angle.

The image is then visible to an observer looking through the hologram in the direction of where the original projecticle 11 was located. If one now allows the hologram to be rotated through some small angle, less than the total included angle γ, the position T2 of projectile 11 is reconstructed. A further small rotation of the hologram allows reconstruction of the projectile 11 in position T3.

The embodiment of the sole figure may be operated without the direct signal beam 47 if desired. However, as disclosed in U.S. Patent application Ser. No. 801,312 filed Feb. 24, 1969 and entitled Holographic System, now U.S. Pat. 3,535,014, one of the advantages to the use of the direct signal beam is that if the orientation of the reflected signal beam is not correct, the system will still provide a direct or diffuse type hologram, which in turn indicated that the orientation of the reflected signal beam must be reconsidered.

What is claimed is:

1. An apparatus for producing a hologram of a moving projectile along a known trajectory, comprising:
   a light source for producing a source beam of coherent radiation of time limited exposure,
   beam divider means in the path of said source beam which divides said source beam into a reference beam and a reflected signal beam,
   velocity detection means for determining the velocity of said projectile,
   beam deflector means responsive to said velocity detection means for directing said reflected signal beam incident on one side of said projectile and for giving said reflected signal beam a tangential velocity at said projectile equal to the linear velocity of said projectile,
   a photographic plate positioned to receive said reflected signal beam after modulation by the one side of said projectile, and
   first reflector means for directing said reference beam incident on said photographic plate so as to cause said reference beam to interfere with said modulated reflected signal beam.

2. The apparatus of claim 1 wherein said beam deflector means includes a beam steerer positioned in the path of said reflected signal beam for controlling the deflection of said reflected signal beam over a predetermined angle lying in the plane of travel of said projectile.

3. The apparatus of claim 2 includes second beam divider means which divides said reference beam into a reference beam and a direct signal beam, and second reflected means for directing said direct signal beam incident on said photographic plate after transmission by a second side of said projectile so as to cause said direct signal to interfere with said reference beam and said modulated reflected signal beam.

4. The apparatus of claim 3 wherein said second reflector means includes a diffuser so positioned in the path of said direct signal beam as to provide a range of angles for the direct signal beam during transmission by said projectile.

5. An apparatus for producing a series of holograms of a moving projectile along a known trajectory in sequential positions, comprising:
   a light source for producing a pulsed source beam of coherent radiation,
   beam divider means in the path of said pulsed source beam which divides said pulsed source beam into a reference beam and a reflected signal beam,
   velocity detection means for determining the velocity of said projectile,
   beam deflection means responsive to said velocity detection means for directing said reflected signal beam incident on the front side of said projectile and for giving said reflected signal beam a tangential velocity at said projectile equal to the linear velocity of said projectile,
   a photographic plate positioned to receive said reflected signal beam after modulation by the side of said projectile, and
   first reflector means for directing said reference beam incident on said photographic plate so as to cause said reference beam to interfere with said modulated reflected signal beam whereby a series and sequential interference patterns are recorded on photographic plate.

References Cited

Redman et al., High Speed Photography-Proceedings of the 8th International Congress-Stockholm, pp. 317–320 (June 6, 1968).

Denisyuk et al., Soviet Journal of Optical Technology, vol. 36. No. 6, pp. 747–748 (November 1968).

DAVID SCHONBERG, Primary Examiner

R. L. SHERMAN, Assistant Examiner

U.S. Cl. X.R.

356—27